Sept. 6, 1966  P. W. JOHNSON  3,270,424
GAGE WITH FIXED SPACED GAGING ELEMENTS AND AN AXIALLY
MOVABLE GAGING ELEMENT THEREBETWEEN
Original Filed Aug. 5, 1959  2 Sheets-Sheet 1

INVENTOR.
PAUL W. JOHNSON
BY
John M. Montstream
ATTORNEY

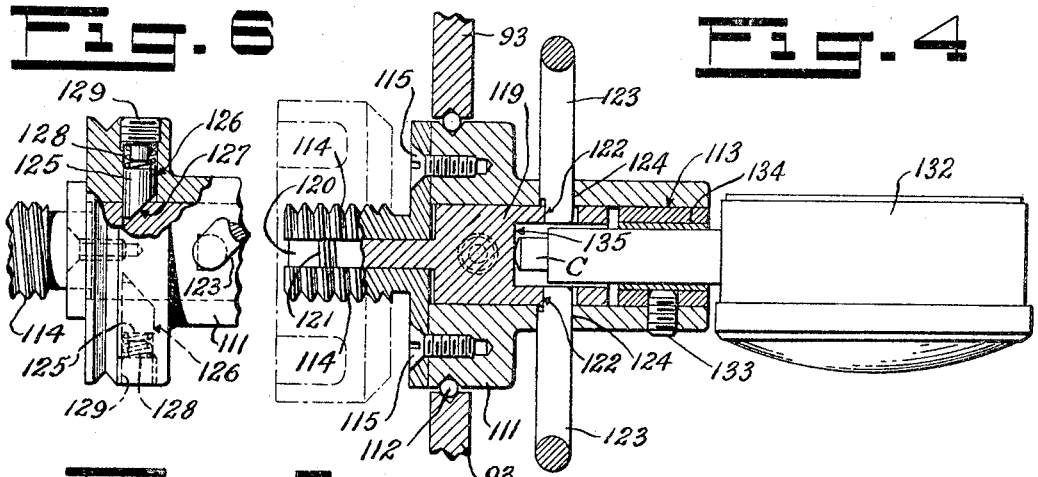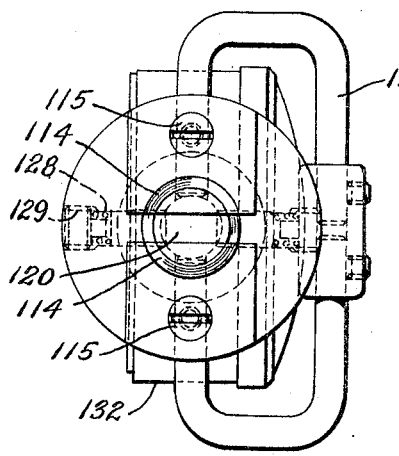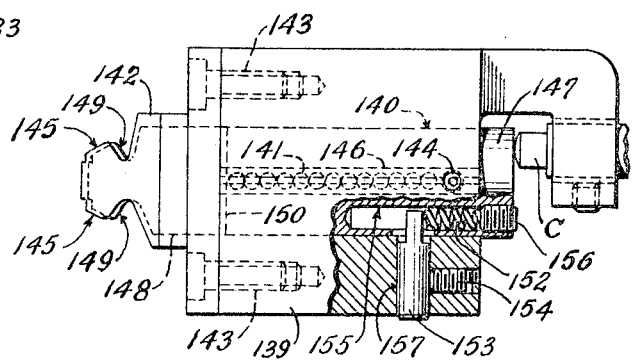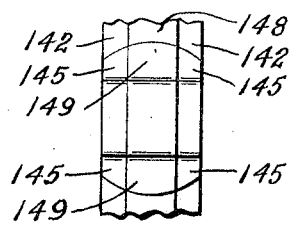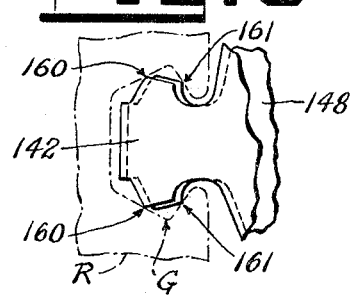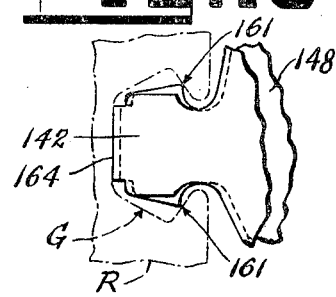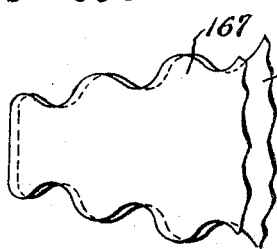
INVENTOR.
PAUL W. JOHNSON
BY
John M. Montstream
ATTORNEY United States Patent Office 3,270,424
Patented Sept. 6, 1966

3,270,424
GAGE WITH FIXED SPACED GAGING ELEMENTS AND AN AXIALLY MOVABLE GAGING ELEMENT THEREBETWEEN
Paul W. Johnson, Bloomfield, Conn., assignor, by mesne assignments, to The Johnson Gage Company, Bloomfield, Conn., a corporation of Connecticut
Original application Aug. 5, 1959, Ser. No. 831,757. Divided and this application July 29, 1963, Ser. No. 299,684
10 Claims. (Cl. 33—174)

This application is a division of application S.N. 831,757 filed August 5, 1959 and now abandoned.

The invention relates to a gage for measuring a screw threaded part and may test as well for other components related to the thread such as the centricity of a conical and/or cylindrical surface or bore with respect thereto and the squareness of one or more faces with respect to the thread. The invention also relates to a gage for measuring the accuracy of a groove, such as the groove on a turbine rotor which groove receives a blade or a screw thread groove as well as a combination of the thread with other structure related thereto to determine the relative acceptability as to centricity, squareness and other factors which may be desirable to be tested on a test part. This thread gage also tests for lead of the thread.

It is an object of the invention to construct a thread gage of simple construction which determines the acceptability of a screw thread and also uses the thread gaging means as holding means for the test part for determining other characteristics of the test part such as squareness of one or more surfaces and/or centricity of one or more surfaces including a taper, a cylindrical bore and a cylindrical surface with respect to the thread.

Another object is to construct a gage for rotatably mounting gaging means for a test part and having a pivotal frame for carrying one or more indicators which frame is pivoted into and retained in gaging position to determine other characteristics or components of the test part when rotated with the gaging means.

Another object is to construct a gage for testing the accuracy of a groove by axial movement of one gage part with respect to another.

A still further object is to construct a simple gage to test a screw thread and to test the thread for lead error.

Other objects of the invention will be more apparent from the following description when taken in connection with the accompanying drawings illustrating preferred embodiments thereof in which:

FIG. 4 is a enlarged longitudinal section through the thread gaging portion of the gage of FIGS. 1 to 3;

FIG. 5 is an end view of the gage of FIG. 4;

FIG. 6 is a section of a part of the gage of FIG. 4;

FIG. 7 is a side view partially in section of a gage for the blade groove of a turbine;

FIG. 8 is a partial end view showing the gaging members of FIG. 7;

FIG. 9 is a view showing gaging members or means having contact points;

FIG. 10 is a view showing gaging members for gaging between the bottom and the outer flank of a turbine blade groove;

FIG. 11 is a view showing gaging members for a turbine blade groove having a plurality of serrations or grooves.

Figure 1:
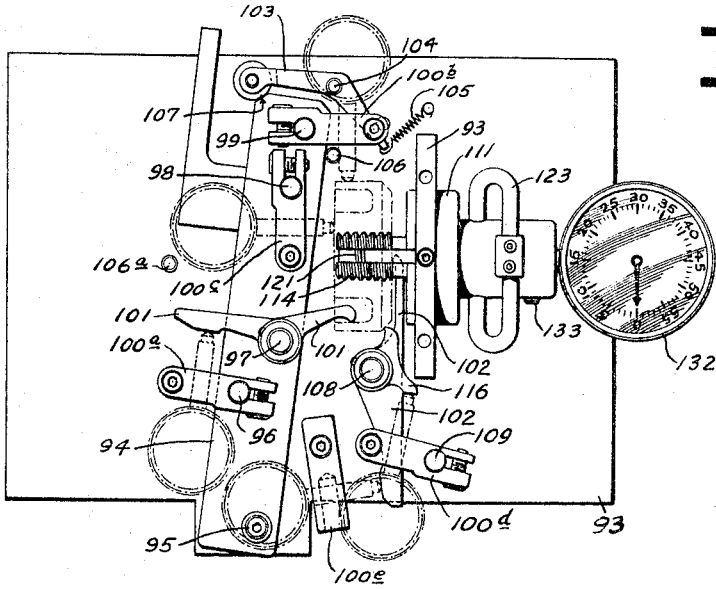
FIG. 1 is a plan view of a gage for testing a screw thread for size and testing other surfaces with respect to the screw thread.
Figure 2:
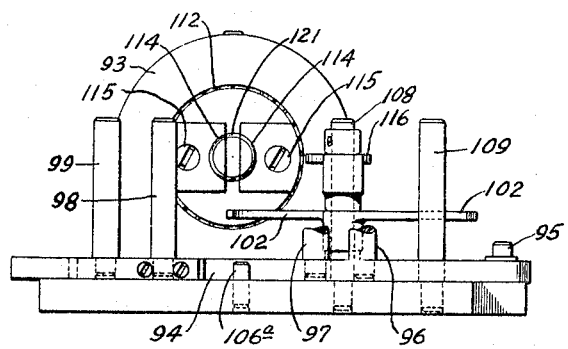
FIG. 2 is an end view of the gage of FIG. 1.

FIGS. 1 to 6 show a gage designed primarily for testing small diameters of test parts, although it is suitable for larger diameters as well. This gage has a thread gaging means in which a pair of gaging elements is fixed and another gaging element is axially movable as will be described hereinafter. In this construction, a base or base member 93 rotatively receives a frame or frame member. The base 93 carries a pivoted frame 94 mounted on a pivot 95 carried by the base. At least one indicator mounting means is carried by the pivoted frame which includes a mounting pin. Four mounting pins are shown namely 96, 97, 98 and 99 and indicator brackets 100a, 100b, 100c, 100d, and 100e. Three of the mounting pins 96, 98, and 99 are shown as carrying an indicator bracket for receiving or supporting an indicator. The mounting pin 97 carries a transfer lever 101 which is pivotally mounted on the pin one end of which is adapted to engage a surface of a groove in the test part to test the centricity of the surface with respect to the groove or thread. An indicator is carried by the bracket 100a on the pin 96 and engages the other end of the transfer lever 101. An indicator carried by the bracket 100b carried by the mounting pin 99 may be positioned to engage the periphery of the test part to test the accuracy of the diameter thereof and the centricity thereof with respect to the thread. A second indicator mounted on a bracket 100c on the mounting pin 98 may engage the end surface of the test part to test its dimension and squareness with respect to the thread. Many variations may be made in the use of this pivoted frame.

Means are provided to hold the pivoted frame 94 in gaging position adjacent to the thread gaging means, the means particularly shown includes a holding lever 103 pivotally mounted on a pin 104 and propelled by a spring 105. The mounting lever when in gaging position, engages a locating stop 106 carried by the base and the holding lever then engages the back end of the pivoted frame or particularly an angular surface 107 thereon so that the pivoted frame is held against the stop by the spring. By pressing the pivoted frame to the left, the holding lever is released and the indicators are swung away from the test part so that it may be removed from the thread gaging means which also serve as holding means for the test part when rotating the frame and the test part. The base may carry other indicator mounting pins 108 and 109. The pin 108 mounts a transfer lever 102 for engaging an end surface of the test part and a second transfer lever 116 for engaging a taper surface on the test part. The pin 109 mounts an indicator bracket 100d for an indicator for engaging the second transfer lever. Another bracket 100e is carried by the base to engage the transfer lever 102.

FIG. 4 shows the construction of a thread gaging means which may be mounted on the base 93. It includes a frame or frame member 111 having a bearing for rotatable mounting the same on the base, the particular means shown being balls 112 receiving in ball grooves carried by the frame and the base. The frame carries a guide or guideway 113 for mounting the operating means for axial movement on the frame. The guide in this construction constitutes central bore. Fixed thread gaging means or elements 114 are secured to the frame in spaced relation such as by screws 115. The thread gaging means 114 are of a diameter to receive the smallest diameter of test thread so that if the test part does not thread thereon it is known to be too small. To test for oversize of an internal thread of a test part, the guide 113 carries an axially movable operating member 119 forming a part of the operating means. The operating member carries an axially movable gaging means 120 which is received and slidable axially in the space or gap between the fixed thread gaging means 114. This gaging means 120 carries on its periphery cooperating thread gaging means shown particularly as a single thread gaging ridge 121 on opposite sides.

The operating means includes means to shift the operating member 119 axially and hence to axially shift the cooperating gaging ridges 121. The means particularly shown includes a cam means 122 shown as flats on an operating lever 123 which is pivotally mounted in holes 124 carried by the frame. Upon pressing the lever 123 the cam means 122 propels the operating member 119 to the left to bring the cooperating gaging ridges 121 into alignment with one of the thread spirals of the gaging members 114 so that the test part may be threaded thereon. The operating means also include spring means for propelling the operating member and the thread ridges 121, for gaging engagement, in the opposite direction or to the right which means is shown as taper means or pins 125 on opposite sides of the frame slidably mounted in a laterally extending bearing or hole 126 and engaging a taper surface 127 in the operating member 119. Each taper pin 125 is pressed radially inwardly by a spring 128, the compression of which may be adjusted by a screw 129 which backs up the spring.

Indicator means is carried by one of the members including the frame 111 and the operating member 119 and engages the other member to indicate the position of one member with respect to the other and thereby indicate whether or not the test part is within the allowable tolerances. In the construction particularly shown an indicator 132 is secured to the frame 111 such as by a screw 133 which deforms a bushing 134 to grip the stem of the indicator. The end of the frame, the contactor C of the indicator engages the operating member 119 at the bottom of a hole 135 so that the relative position of the operating member and its cooperating gaging ridge 121 with respect to the frame and the gaging means 114 is indicated.

In operation the thread gaging ridge 121 is brought into alignment with the adjacent one of the thread ridges on the fixed gaging members 114 by depression of the lever 123 and upon its release the springs 128 press the operating member to the right and brings the cooperating thread gage ridges 121 into contact with the right hand flank of the test thread. If the indicator 132 shows that the thread groove is to wide, the indicator pointer will give a reading outside of the desired tolerance limits. If the test thread is within the limits the indicator pointer will come within the tolerance limits allowed for the test thread.

The gage will also indicate any error in lead by watching the indicator as the test part is threaded on the fixed gaging means 114. By noting the reading when the first thread of the test part is engaged by the gaging ridge 121 and upon continued rotation of the test thread onto the fixed thread gaging members 114 and noting changes in the indicator reading, which indicates changes in relative position of the ridge 121 for succeeding threads. If the reading on the indicator varies, this shows that the lead of the thread is faulty. An increasing reading on the indicator will show a long lead and a decreasing reading will show a short lead.

Figure 3:
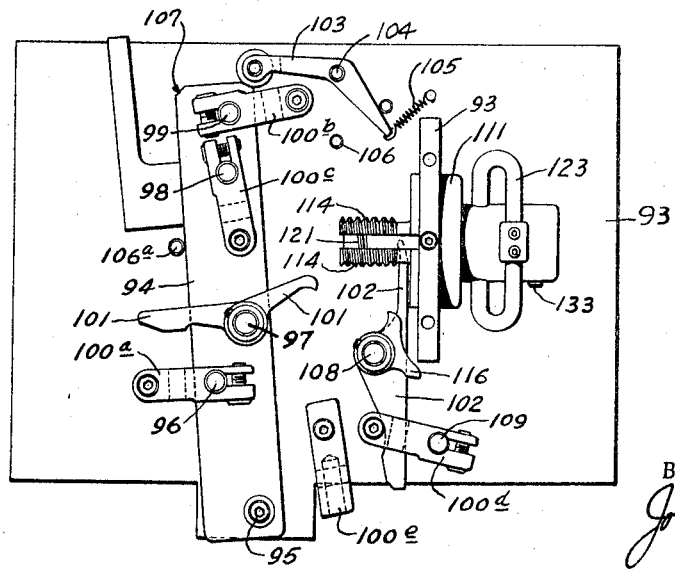
FIG. 3 is a plan view of the gage of FIG. 1 with certain indicators mounting means retracted.

The gage of FIG. 4 when mounted on the base of FIG. 3, provides a thread gage as well as a holding means for a test part. The base constitutes an indicator carrying member having indicator mounting means and may have one or more transfer levers to extend between a surface of the test part and an indicator. When the thread has been gaged, the test part is advanced until an indicator such as an indicator reading from the transfer lever 102 shows zero. Then by rotating the thread gaging means and the test part held thereby, the centricity or squareness of other surfaces of the test part with respect to the thread, as well as the dimension of the part having the surface, is determined. If the indicator readings do not change then the particular surface is square or concentric with the thread.

The gage as shown in FIGS. 4 through 6 may be disconnected from the base 93 by removal of the balls 112 from the ball race or groove and serve as a hand gage for testing the thread of a test part or it may be conveyed to a threaded hole in a large casting and an "on the job" check of any such thread may be made. With the gage mounted on the base of FIGS. 1 to 3 the thread gaging means also constitutes means for holding the test part. Rotation of the gage and of the gage and of the test part held by the thread gaging means while mounted on the base, various tests may be made as to squareness and centricity of various surfaces with respect to the thread. The thread gaging means grips the test part sufficiently so that it remains set thereon and does not shift so that the test part when rotated will operate these various other indicators carried by the base to test other surfaces of the test part.

The gage of FIGS. 1 through 6 show a gage for testing a groove and particularly a thread groove. FIGS. 7 and 8 show a gage of essentially similar construction designed particularly for gaging a groove, such as a groove in the rotor of a turbine for receiving the anchoring wedge of a turbine blade. This gage shows a frame 139 having an axial guide or guideway 140, the guide particularly shown being a bore in the frame. Preferably the frame has ball grooves 146 on opposite sides for receiving balls 141. The frame carries a pair of fixed gaging members 142 secured to the frame in spaced relation such as by screws 143. The fixed gaging members carry gaging surfaces or elements 145 corresponding with the anchoring surfaces of the turbine or rotor groove to be gaged. The frame may carry screws 144 for obstructing the grooves for the balls 141 so that they will not fall out of the open end of the ball groove.

An operating member 147 is mounted in the guide or guideway for axial movement. This operating member carries an extension 148 and is received in the space between the fixed gaging members 142. The extension carries a cooperating gaging member having a cooperating gaging surface or element 149 on the opposite side or facing in the opposite axial direction from the gaging surfaces 145 of the fixed gaging members. Means are provided to propel the operating member 147 axially with respect to the frame which includes spring means 152, one end of which engages an abutting pin 153 carried by the frame 139 in a hole 157 and locked in position by a screw 154 in the frame. The abutting pin projects into and the spring is received within a hole 155 in the operating member. The other end of the spring engages a screw 156 carried by the operating member which also may be used to adjust the compression of the spring. An indicator is carried by a bracket on the frame, the contactor C of which indicator engages the end of the operating member and hence indicates the relative position of the gaging members and the acceptability of the groove being gaged.

In gaging a turbine blade groove, the operating member 147 is depresed to bring the gaging members and their surfaces into alignment so that it may be inserted into the groove. The surfaces are in alignment when the shoulder 150 on the end of the operating member 147 abuts the fixed gaging members 142. When inserted, the operating member is released whereupon the spring 152 propels the operating member 147 to the right and shifts the gaging surfaces 149 to the right with respect to gaging surfaces 145 so that the gaging surfaces contact with opposite faces of the turbine rotor blade groove. Each contacting surface or gaging element 145 engages one side of the groove and each of the other contacting surfaces or gaging elements 149 engage its surface on the other side of the blade groove. If the groove is too small or too large, the indicator will show a reading outside of the tolerance limits for the groove. The gage is moved circumferentially to various parts of the groove and readings taken to test the entire groove.

It is clear that the surfaces opposite from the respective surfaces 145 and 149 may be gaging surfaces from those particularly marked 145 and 149 or a reverse operation in which event the spring 152 is located in the hole on the other side of the abutment 153 to change direction of spring propelled axial movement of the operating member 147 with respect to the frame.

FIG. 8 is an enlarged end view of the gaging members or means of FIG. 7 showing a circular contour therefor. Usually in a blade anchoring groove in a turbine there is but one opening in the circumference thereof wide enough to pass a blade and hence to pass the gaging elements of the gage. With the gaging means 142 and 148 narrow enough to pass through the slot into the anchoring groove, the gage may then be turned 90 degrees to bring the gaging means into gaging position in the groove. In this way the gage may be inserted any where in the periphery of the turbine slot and it is not necessary to work the gage around the anchor groove from the single opening thereinto.

FIG. 9 shows gaging means for gaging a blade anchoring groove in a turbine or rotor R at the pressure points alone. In this construction the gaging elements 142 carry gaging points 160 facing in one axial direction to engage one surface of the groove and particularly the bottom inclined surface and the center gaging element 148 carries gaging points 161 which engage the pressure point on the other upper surface of the anchor groove G. This gaging operation is comparable to gaging the pitch diameter of a screw thread.

FIG. 10 shows another form of the gaging means in which the one gaging member such as 148 carries gaging points 161 as described and the other gaging members or the fixed members 142 have gaging surfaces 164 which engages the bottom of the groove and tests the distance between the bottom and the pressure point on the outer inclined surface of the groove. It is clear that instead of providing the gaging point 161 the member may carry the gaging surface 149 FIG. 7. With a set of gages with gaging elements as described all the pertinent characteristics of a blade wedge groove may be determined.

FIG. 11 shows gaging means 166 which may be carried by the operating member 147 on its extension 148 and the fixed gaging members or elements 167 are carried by the fixed gaging 142. The gage mounted with these types of gaging members or elements can gage the overall acceptability of a wedge groove for the blades of a turbine having a plurality of serrations or ridges therein.

The ball bearings 112 for rotatably mounting the frame 111 on the base 93 is so constructed that there is no shake in the bearing whereby accurate determination of the squareness or centricity of other surfaces of the test part with respect to the screw thread is secured. This is accomplished by selecting balls which are oversize with respect to the ball space between ball races or grooves and are pressed into the ball space. The frame 111 nevertheless rotates freely upon the base. The balls may be oversize by about one to two ten thousandths of an inch and one and a half ten thousandths is a desirable oversize. The balls 141 are similarly selected to be oversize for the ball races or grooves and are pressed therein so that they are under compression at all times. The spring 152 assures that the gaging pressure is the same for all gaging operations with the particular spring pressure setting made. If desired the operating member 119 of the gage of FIG. 4 may be similarly mounted on ball bearings with oversized balls.

This invention is presented to fill a need for improvements in gage with fixed spaced gaging elements. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage for a test part with a groove having opposite surfaces and adapted to carry an indicator having a contactor comprising a frame member, an axially extending guideway carried by the frame member; operating means including an operating member mounted on the guideway for axial movement and having an axis, spring means propelling the operating member axially along the guideway, and manual means connected with the operating member to move the same against the spring means, gaging means to gage the groove of the test part including fixed gaging elements spaced from each other by gaps spaced apart circumferentially with respect to the axis by at least 90 degrees and secured to the frame member, each of the fixed gaging elements having gaging ridges at least at the edges of the gaps, the gaging ridges corresponding with the groove of the test part, each ridge having a gaging surface to engage one flank surface of the groove of the test part and having an axis coaxial with the axis of the operating member, the gaging surfaces engaging the flank surface of the test groove facing in one axial direction, movable cooperating gaging elements located in each gap between the spaced gaging elements and coaxial with the axis of the operating member and connected with the operating member and movable thereby, and the cooperating gaging elements having at least one gaging means on the opposite side of a plane at right angles to a radial plane through one gaging means and including the axis, each gaging means being equally spaced from the axis and corresponding with the groove of the test part, each gaging means having a gaging surface to enage opposite surfaces of the groove; the spring means propelling the operating member in a direction to bring the gaging means into contact with opposite surfaces of the groove to be gaged, and indicator mounting means carried by one member and located to have an indicator contactor engage the other member for indicating the relative position of the members and the gaging means.

2. A gage for a test part with a groove having opposite angular flank surfaces and adapted to carry an indicator having a contactor as in claim 1 in which the oppositely directed gaging surfaces are angular corresponding with the angular flank surfaces of the groove of the test part, the oppositely directed angular gaging surfaces centralizing the test part with respect to the axis of the operating member, including an indicator carrying member, a circular bearing carried by the frame member and indicator carrying member concentric with the axis of the operating member and the gaging means and one of said frame member and base member being rotatable with respect to the other, and at least one indicator mounting means carried by the indicator carrying member.

3. A gage as in claim 2 including ball bearing mounting means mounting the operating member on the guideway, the circular bearing being ball bearing mounting means, each ball bearing mounting means including balls and cooperating ball bearing surfaces spaced from each other to receive the balls, and the balls being oversized by about one and a half ten thousandths of an inch for the ball spaces between cooperating ball bearing surfaces and requiring pressure for their insertion in the ball spaces.

4. A gage as in claim 1, in which the gaging surfaces of the pair of spaced gaging members carrying a screw thread of a plurality of turns, and the gaging surfaces of the cooperating gaging member carries a single thread ridge on each side thereof approximately midway of the screw thread of the pair of gaging surfaces.

5. A gage as in claim 1 in which the pair of fixed spaced gaging members have side edges and end edges, the cooperating gaging member has side edges and an end edge, and the edges of the spaced gaging members having gaging elements facing in one axial direction thereof and the cooperating gaging member having gaging elements on its edges facing in the other axial direction.

6. A gage as in claim 5 in which one of the gaging elements is the end edge of the gaging member.

7. A gage as in claim 2 including a pivoted frame, pivot means mounting the pivoted frame on the base member for movement towards and away from the gaging means, and at least one indicator mounting means carried by the pivoted frame.

8. A gage for a test part with circular groove means having opposite angular surfaces comprising a frame member, an axially extending guideway carried by the frame member; operating means including an operating member mounted on the guideway for axial movement thereon and having an axis, and means propelling the operating member axially along the guideway; means to engage the groove of the test part and to centralize the groove of the test part with respect to the axis of the operating member including fixed means carried by the frame member and spaced circumferentially from each other by at least two gaps, ridge means carried by the fixed means at least at the edges of the gaps and corresponding to the groove of the test part, the ridge means having at least one surface facing axially in one direction to engage one angular surface of the groove of the test part, the ridge means having an axis coaxial with the axis of the operating member, a cooperating element located in each gap and operatively connected with the operating member and movable axially thereby in the gaps, at least one ridge on opposite sides of the cooperating element and corresponding with the groove of the test part and having a surface facing axially in the opposite direction to engage the other angular surface of the test part, the ridges of the cooperating element being equally spaced from the axis of the operating member whereby the ridge means of the fixed means and ridges of the cooperating element centralize the axis of the groove of the test part on the axis of the operating member, and a circular bearing carried by the frame member having an axis coinciding with the axis of the operating member.

9. A gage as in claim 8 including an indicator carrying member having a cooperating circular bearing received on the circular bearing of the frame member, and at least one indicator mounting means carried by the indicator carrying member, one of the members including the frame member and the indicator carrying member being rotatable with respect to the other on the bearings.

10. A gage as in claim 1 including ball bearing mounting means mounting the operating member on a guideway including balls and cooperating ball bearing surfaces spaced from each other to receive the balls, the balls being oversized by about one and a half ten-thousandths of an inch for the ball spaces between cooperating ball bearing surfaces and requiring pressure for their insertion in the ball spaces.

References Cited by the Examiner
UNITED STATES PATENTS

| | | | |
|---|---|---|---|
| 2,087,896 | 7/1937 | Blomstrom | 33—147 X |
| 2,427,152 | 9/1947 | Moore | 33—174 |
| 2,556,564 | 6/1951 | Troedson | 33—199 |
| 2,806,294 | 9/1957 | Cargill | 33—199 |

OTHER REFERENCES

Allan: Rolling Bearings, Pittman Publish. Corp., N.Y., 2nd Edition, 1946 (TJ 1071.A 55), pages 235–237.

LEONARD FORMAN, *Primary Examiner.*